United States Patent
Mack et al.

(10) Patent No.: US 7,999,862 B2
(45) Date of Patent: Aug. 16, 2011

(54) METHOD AND APPARATUS FOR AN AUTOMATED BACKGROUND LIGHTING COMPENSATION SYSTEM

(75) Inventors: Newton Eliot Mack, Pasadena, CA (US); Philip Mass, Portland, OR (US)

(73) Assignee: Lightcraft Technology, LLC, Pasadena, CA (US)

( * ) Notice: Subject to any disclaimer, the term of this patent is extended or adjusted under 35 U.S.C. 154(b) by 427 days.

(21) Appl. No.: 12/257,653

(22) Filed: Oct. 24, 2008

(65) Prior Publication Data
US 2009/0262217 A1 Oct. 22, 2009

Related U.S. Application Data

(60) Provisional application No. 60/982,297, filed on Oct. 24, 2007.

(51) Int. Cl.
*H04N 5/262* (2006.01)
*H04N 5/222* (2006.01)
*H04N 9/74* (2006.01)
*H04N 9/75* (2006.01)
*G06K 9/00* (2006.01)
*G06K 9/40* (2006.01)
*G03B 19/18* (2006.01)
*G03B 21/32* (2006.01)

(52) U.S. Cl. ........ 348/239; 348/722; 348/587; 348/592; 348/586; 382/162; 382/254; 382/274; 352/48; 352/85; 352/53

(58) Field of Classification Search .............. 348/239, 348/580–582, 722, 584–600, 227.1, 366, 348/602, 251; 382/162–167, 254–274; 352/48, 352/53, 85, 71
See application file for complete search history.

(56) References Cited

U.S. PATENT DOCUMENTS

| | | | | |
|---|---|---|---|---|
| 5,345,313 A * | 9/1994 | Blank | | 348/598 |
| 5,886,747 A * | 3/1999 | Tzidon et al. | | 348/587 |
| 6,052,648 A * | 4/2000 | Burfeind et al. | | 702/3 |
| 6,122,013 A * | 9/2000 | Tamir et al. | | 348/587 |
| 6,611,297 B1 * | 8/2003 | Akashi et al. | | 348/739 |
| 7,070,277 B2 * | 7/2006 | Trumbull | | 352/243 |
| 7,830,566 B2 * | 11/2010 | Yamada et al. | | 358/518 |

* cited by examiner

*Primary Examiner* — Lin Ye
*Assistant Examiner* — Marly Camargo
(74) *Attorney, Agent, or Firm* — Mark S. Leonardo; Lillian R. Horwitz; Brown Rudnick LLP

(57) ABSTRACT

A system and method for removing background lighting variations from an image. The method includes capturing at least one first image including a first background and a subject wherein the at least one first image includes at least one background lighting variation, creating a virtual background model of the first background, creating a virtual background image that is substantially similar to the first background, and generating an output comprising at least one first image with at least one background lighting variation removed therefrom.

20 Claims, 5 Drawing Sheets

A

B

C

METHOD AND APPARATUS FOR AN AUTOMATED BACKGROUND LIGHTING COMPENSATION SYSTEM

CROSS-REFERENCE TO RELATED APPLICATIONS

This patent application claims priority to U.S. Provisional Patent Application Ser. No. 60/982,297, filed in the United States Patent and Trademark Office on Oct. 24, 2007, by Mack et al., the entire contents of that application being incorporated herein by reference in its entirety.

BACKGROUND

1. Technical Field

The present disclosure generally relates to the field of combining real scene elements from a camera, such as a television type camera, with virtual scene elements from a virtual camera into a finished composite image. More specifically, the present disclosure is directed towards methods for working with the imperfectly lit blue or green screen backgrounds typically found in composite video and motion picture production.

2. Background

The state of the art in combining real world imagery with additional imagery from another source is a process that requires considerable precision. The most common process used to combine the real world or live action imagery with virtual imagery uses a blue or green background against which the live action subject is photographed. The live action image is then processed to remove the blue or green background, and is then combined with a different background image to produce a final composite image. The blue or green removal process is typically called "keying."

Several types of keying systems are in common use, among them are chroma keying, luma keying, and color difference keying. Since the basic process behind most of the keying methods is comparing some value of the foreground image against the value of the background image, they share a common requirement for a very evenly lit background image in order to generate an accurate separation between the foreground and background image. If the background is unevenly lit, and the separation parameters in the keying control are increased enough to completely remove the background from the live action image, the keying system will typically remove significant sections of the live action subject, typically including highly visible elements, such as fine hair detail. This destroys the illusion of the composite image and is a main contributor to the artificial appearance of poorly made composite images.

This requirement is complicated by the physics of lighting large flat backgrounds. Since a given light source lowers in lighting intensity as a function of the distance from the source, lights tend to produce a bright area on the background area nearest to the light source, and a darker area on either side. A variety of methods have been employed to try to even out the background lighting and thus improve the keying performance, but achieving a perfectly evenly lit background is a notoriously difficult and time consuming task, and contributes greatly to the expense of doing composite motion picture photography.

One method of correcting lighting variations is to use a reference image of the lit background taken before there are live action subjects placed in front of it. This reference image contains the same background lighting variations that are found in the live action foreground image. Since the lighting variations are then known, the live action image's background can be normalized by dividing the live action image by the reference image, and then multiplying the result by the average color of the reference image. This results in a live action image with only some of the background lighting variation removed.

The above technique does not provide good results. Further, for a shot that involves a moving camera, which is very common in the motion picture and television industries, the above technique will not work, as the reference background image is no longer accurate as soon as the live action camera is moved.

SUMMARY

According to an aspect of the present disclosure, a system for removing background lighting variations from an image is provided. The system includes at least one camera for capturing at least one first image and a video processor. The at least one first image includes a first background and a subject wherein the at least one first image comprises at least one background lighting variation. The video processor creates a virtual background model of the first background. The video processor further creates a virtual background image that is substantially similar to the first background. The video processor also generates an output, which is comprised of at least one first image with at least one background lighting variation removed therefrom.

According to another aspect of the present disclosure, a method for removing background lighting variations from an image is provided. The method includes capturing at least one first image comprising a first background and a subject wherein the at least one first image comprises at least one background lighting variation. The method further includes creating a virtual background model of the first background. The method also includes creating a virtual background image that is substantially similar to the first background and generating an output comprising at least one first image with at least one background lighting variation removed therefrom.

According to yet another embodiment of the present disclosure, a method for removing background lighting variations from an image is provided. The method includes capturing at least one first image comprising a first background and a subject wherein the at least one first image comprises at least one background lighting variation. The method further includes creating a textured virtual background model of the first background. The method also includes creating a virtual background image that is substantially similar to the first background and generating an output comprising at least one first image with at least one background lighting variation removed therefrom.

BRIEF DESCRIPTION OF THE DRAWINGS

The objects and features of the present disclosure, which are believed to be novel, arc set forth with particularity in the appended claims. The present disclosure, both as to its organization and manner of operation, together with further objectives and advantages, may be best understood by reference to the following description, taken in connection with the accompanying drawings as set forth below:

DETAILED DESCRIPTION OF EXEMPLARY EMBODIMENTS

The present disclosure provides a rapid, efficient, reliable system for producing a live action image with the background lighting variations removed, which will dramatically improve the keying process and thus the quality of the resulting composite image. Applications ranging from video games to feature films may implement the system for a fraction of the cost of attempting to achieve perfectly even background lighting with the limitations of physical lights. The system greatly reduces the cost and complexity of the lighting equipment, and enables a much wider usage of the virtual production method.

The present disclosure teaches a new method for background compensation, where the method enables the removal of background lighting variations with a moving camera. It further teaches a method to provide this compensation in real time, so that the overall quality of the composite can be inspected at the time of photography, instead of later on after there is no chance of on-set adjustment. Furthermore, it teaches the application of the method to be used rapidly with the same camera, which may be used for the composite photography.

Reference will now be made in detail to exemplary embodiments of the present disclosure, which are illustrated in the accompanying figures. The same reference numbers in different drawings may identify the same or similar elements. In addition, the following detailed description does not limit the present disclosure.

An objective of the present disclosure is a method and system for creating, positioning, and rendering an image of a virtual model of a background that precisely matches the position, orientation, and field of view of a live action image of a subject against a live action background, and combining the live action image with the virtual image to create a live action image whose background is as close as possible to a single color value.

Figure 1:
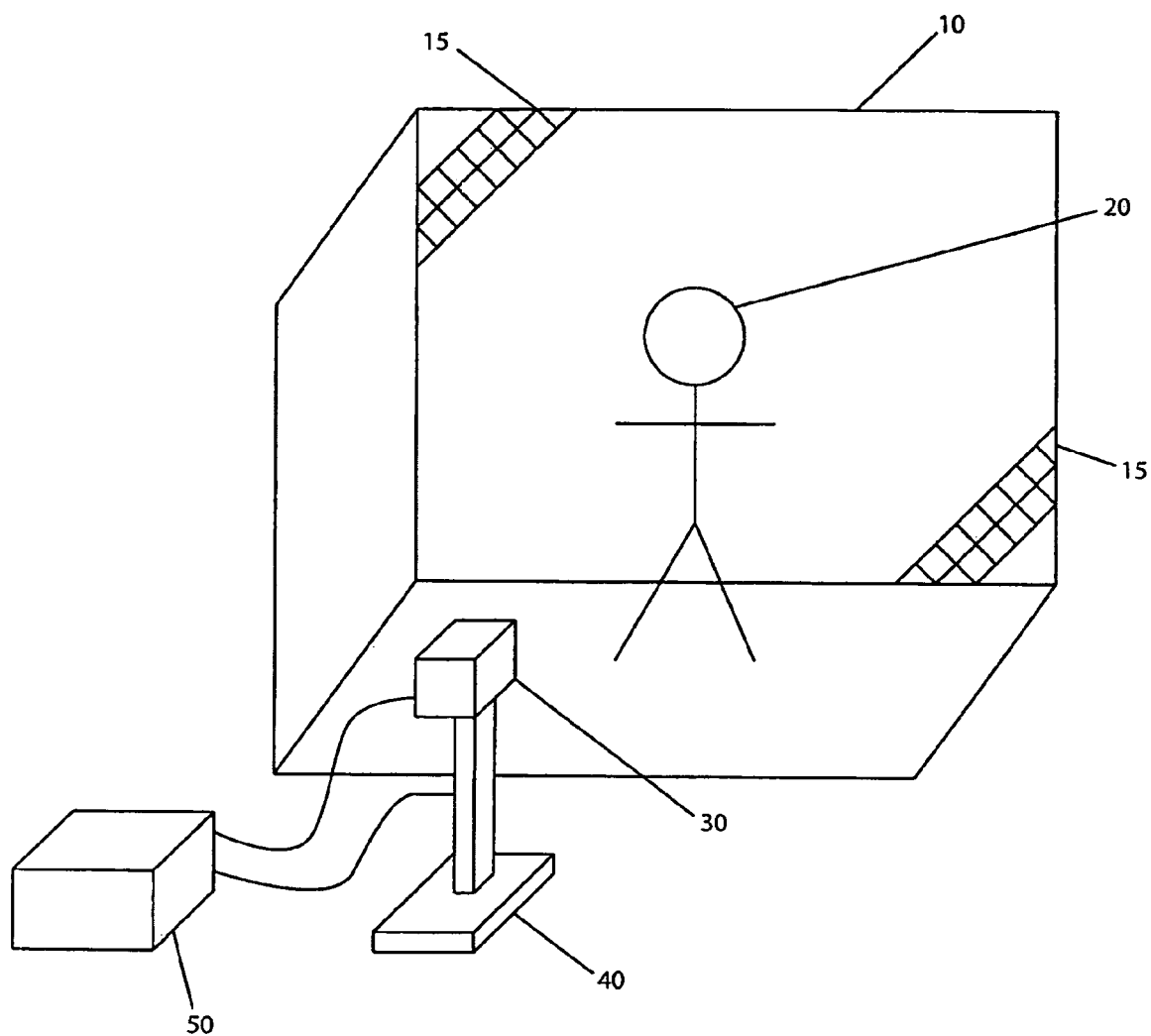
FIG. 1 illustrates a perspective View of an embodiment, in accordance with the present disclosure.

Referring to FIG. 1, an embodiment of the present invention is presented. A scene camera 30 is positioned to capture an image of a subject 20 in front of a background 10. The background 10 has a series of lighting variations 15 that may cause problems with the keying process. The scene camera 30 is mounted on a camera tracking system 40. This camera tracking system 40 may be in the form of an encoded pedestal, dolly, jib, crane, or any other form of camera position, orientation, and field of view measuring system. Focus distance may also be measured to simulate the depth of field defocus that the physical background 10 will undergo through the scene camera 30's lens. There may be more than one scene camera to enable capturing of different views of the subject's performance. The scene camera 30 and the camera tracking system 40 are connected to a video processing system 50. The video processing system 50 takes the incoming live action video image, generates the corresponding background virtual image, and performs the background lighting variation removal using the two images. In an embodiment, video processing system is a computer with a live video input, a camera tracking data input, and a video card capable of processing 2D video and 3D computer graphics calculations.

Figure 2:
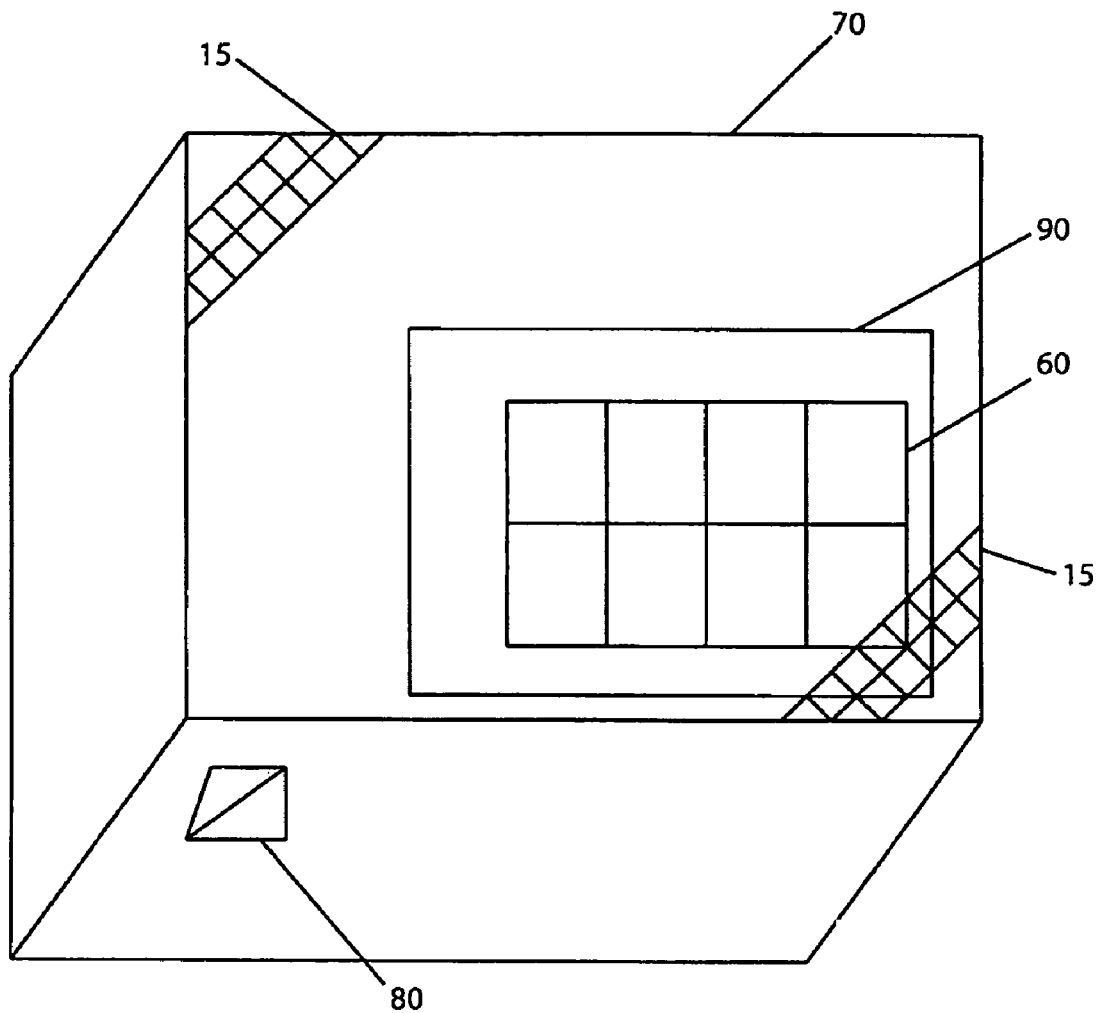
FIG. 2 illustrates a perspective view of an embodiment, in accordance with the present disclosure.

Referring to FIG. 2, the video processing system 50 may generate an image of the background 10, including lighting variations 15, that does not include subject 20. A virtual camera 80 is placed in a virtual model 70 of the physical background 10. The virtual model 70 is accurately textured with photographic information that represents how the physical background 10 is presently lit, including lighting variations 15. To achieve this, a series of images 90 of the physical background 10 are taken. Since a physical background 10 may be large, to completely texture the virtual model 70 it may require a large number of images 90 to be taken and placed. Typically, only a subset of the overall image 90 is desired. To achieve this, a subset of each image 90 is located on the corresponding virtual model 70 by a virtual image location grid 60 which may be manipulated by the operator to select which portion of the physical background 10 is to be captured to the virtual model 70. The operator may superimpose the virtual image location grid 60 over the live video output of scene camera 30, and move the scene camera to make sure that virtual image location grid 60 is being properly located by camera tracking system 40.

Figure 3:
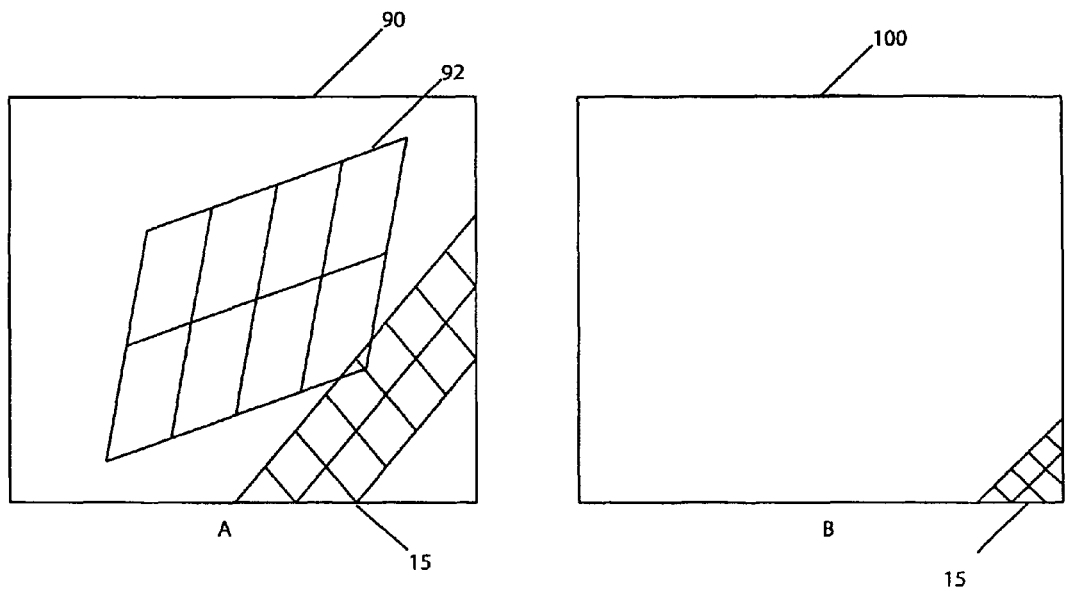
FIG. 3A illustrates a quadrilateral projection of an embodiment of a captured background image, in accordance with the present disclosure.
FIG. 3B illustrates an embodiment of an image transformed, in accordance with the present disclosure.

In order to determine which area of the virtual model 70 that the incoming image 90 specified by the virtual image location grid 60 should be applied to, a set of mathematical transformations may be applied. Referring to FIG. 3A, the transformation of the corners of the virtual image location grid 60 to two-dimensional window coordinates, which represent the projection of virtual image location grid 60 onto a 2D surface 90 and creating a 2D quadrilateral 92, is presented. To compute the 2D window coordinates from the 3D X, Y, and Z positions of the virtual image location grid 60, the following transformations may be used.

In an embodiment, $v=(objX, objY, objZ, 1.0)$ and is represented as a matrix with 4 rows and 1 column. Then $v'$ is computed as $v'=P \times M \times v$, where P is the current projection matrix, and M is the current model view matrix. The projection and model view matrices are identical to those found in standard 3D graphics techniques, and 'x' represents matrix multiplication. If the dimensions of the 2D window surface 90 are defined in the vector view[4] as:

view[0]=2D surface x origin view[1]=2D surface y origin view[2]=2D surface width view[3]=2D surface height then the window coordinates are then computed as follows:

$winX=view[0]+view[2]*(v'[0]+1)/2$ $winY=view[1]+view[3]*(v'[1]+1)/2$

Computing this transformation for each of the four corners of the virtual image location grid 60 results in a 4×2 vector, screenCorners[4][2], of the 2D screen corner location coordinates of quadrilateral 92.

In an embodiment presented in FIG. 3A, the original background image data 90 from a given photograph is presented. However, the only portion of the image data for which accurate 3D position information is known is the irregular quadrilateral area 92 that was specified by the virtual image location grid 60. The next required step is to 'stretch' the projected irregular quadrilateral area 92 into regular rectangular texture data 100 suitable for texture mapping onto the virtual background model 70 depicted in FIG. 2.

In an embodiment presented in FIG. 3B, rectangular texture 100 has been created from the irregular quadrilateral subset 92 of texture image 90 via a coordinate transformation. This is achieved by doing a texture lookup of image data 90 using a set of texture coordinates defined as the following:

$$screen.x = (INTEXCOORD.y*(x1 + INTEXCOORD.x*xScale1)) + ((1.0 - INTEXCOORD.y)*(x0 + INTEXCOORD.x*xScale0));$$

$$screen.y = (INTEXCOORD.x*(y1 + INTEXCOORD.y*yScale1)) + ((1.0 - INTEXCOORD.x)*(y0 + INTEXCOORD.y*yScale0));$$

where INTEXCOORD.xy represents the texture coordinate of the incoming raw image 90, x0, y0 and x1, y1 are the x,y 2D coordinates of the left hand corners of irregular quadrilateral 92, and $$xScale0 = screenCorners[1][0] - screenCorners[0][0];$$

$$xScale1 = screenCorners[2][0] - screenCorners[3][0];$$

$$yScale0 = screenCorners[3][1] - screenCorners[0][1];$$

$$yScale1 = screenCorners[2][1] - screenCorners[1][1];$$

The output texture 100 is then simply generated by a texture lookup of the incoming texture 90, using the screen.x and screen.y values as the transformed texture lookup coordinates. The transformed texture 100, including background lighting variations 15, can then be easily used to cover all or part of a section of virtual background model 70, as its 2D texture coordinates are now matched to the 2D texture coordinates of the virtual background model.

'Vignetting' is a typical defect of physical camera lenses that causes the edges of an image to be darker than the center of an image. Since the virtual background model 70 may require several transformed textures 100 to be superimposed to fully texture it, the vignetting of each raw image 90 will cause a visible mismatch where the edges of textures 100 intersect, and must be removed.

Figure 4:
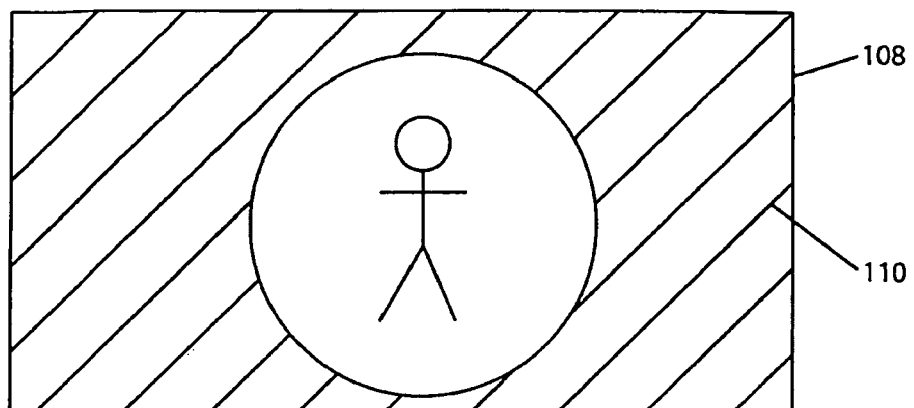
FIG. 4A illustrates an embodiment of a live action image, in accordance with the present disclosure.
FIG. 4B illustrates an embodiment of a live action image, in accordance with the present disclosure.
FIG. 4C illustrates an embodiment of a live action image, in accordance with the present disclosure.
Figure 4:
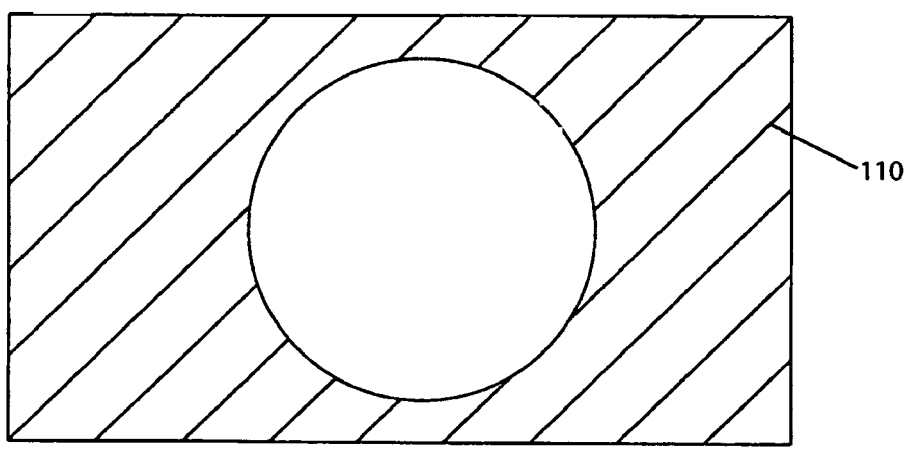
Figure 4:
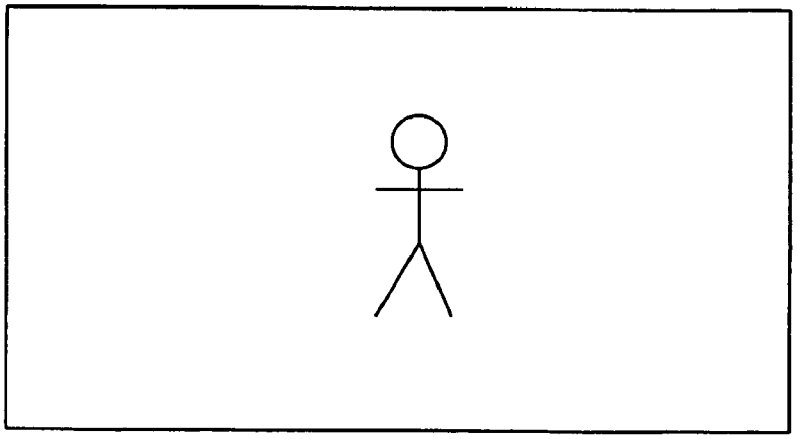

In an embodiment presented in FIG. 4A, a typical frame 108 of a subject in front of a background is presented, with an exaggerated depiction of the lens vignetting 110. To remove the vignetting 110, a reference image must be used to isolate the effects of the camera lens from the subject.

Referring to FIG. 4B, a frame taken of a pure white background is presented. This frame may be achieved by holding a white card close to the lens. Since there is no color information in the image, the vignetting 110 is isolated and can then be used to correct a live image.

Referring to FIG. 4C, a frame of a subject taken that has been processed using the information from the vignette image 110 to remove the effects of the vignetting is presented. This is achieved by dividing the input image 108 by the vignette image 110, and then multiplying the result by the average value of the vignette image 110. The same process can be used on the raw input images 90; this results in a corrected version of texture 100 that can then seamlessly tile with the other versions of texture 100.

Figure 5:
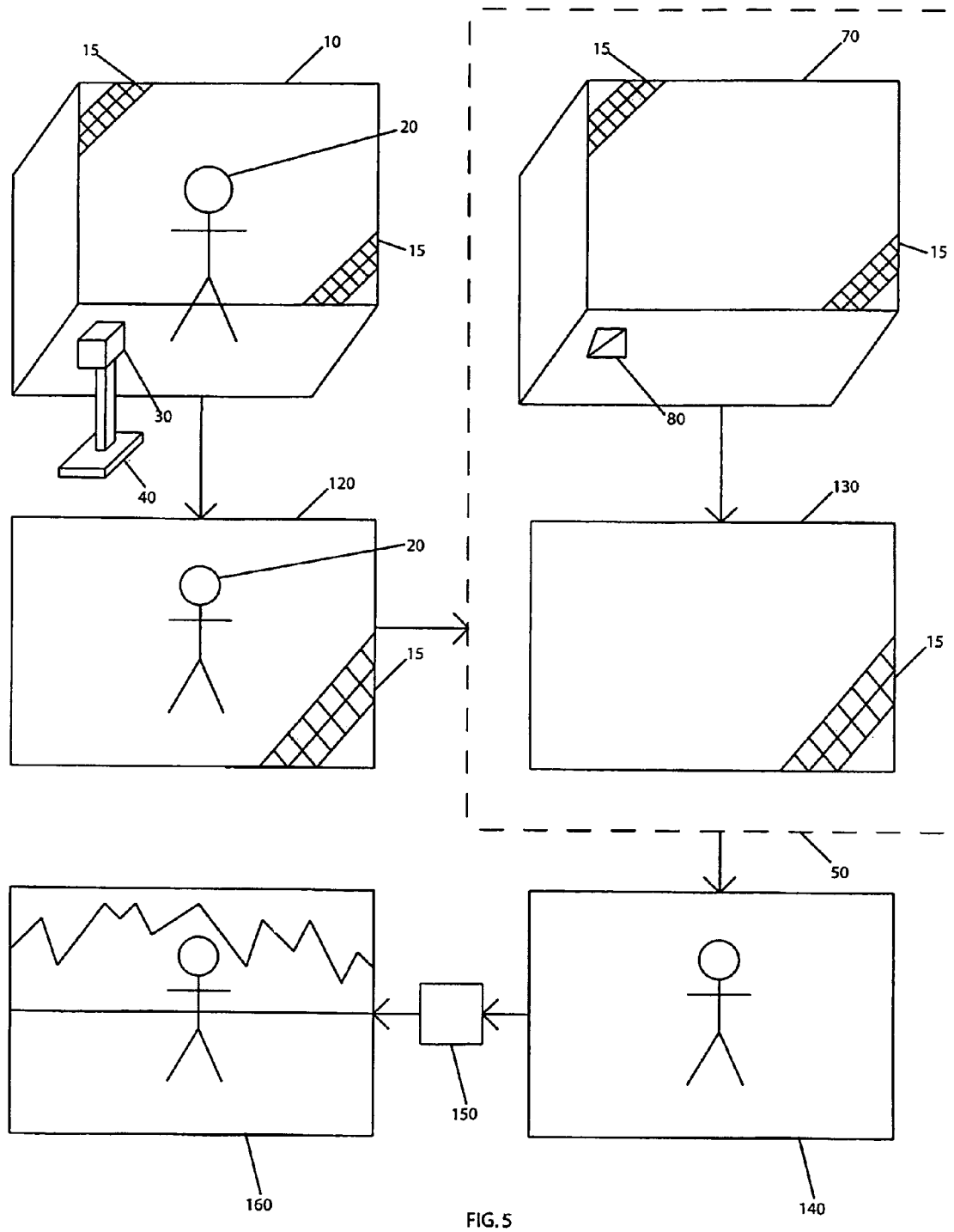
FIG. 5 illustrates an embodiment of a combination of a perspective view of a physical set and perspective view of the matching virtual background in combination with a block diagram of the components of the background lighting compensation system, in accordance with the present disclosure.

Turning now to implementation details, the present disclosure described above is realized using the system as presented in FIG. 5. The elements of the system thus include a scene camera 30, a 3D camera tracking system 40, a physical background 10 with background lighting variations 15, a subject 20, a textured virtual model of the background 70, a virtual camera 80, and a video processing system 50. The scene camera 30 is mounted to the 3D camera tracking system 40 so that the scene camera's position, orientation, and field of view information is sent to video processing system 50. In addition, the scene camera sends the live action image 120 including subject 20 and background lighting variations 15 to the video processing system 50.

The video processing system 50 contains the textured virtual background model 70. The position and orientation data from the 3D camera tracking system 40 is used to set the position and orientation of a virtual camera 80 within virtual background model 70. Using these two components, the video processing system 80 generates a virtual background image 130 that includes the background lighting variations 15.

The live action image 120 and the virtual background image 130 are then combined to create a corrected live action image 140, where the background lighting variations 15 have been removed. This takes place with a similar math transform to the vignetting calculations:

Corrected image = (live image/virtual image)*average color of virtual image

This calculation is generally decomposed into the red, green, and blue channels, so that each color is calculated at each pixel location using the above formula. From this calculation, it can be seen that elements of the background of live action image 120 that are greater or lesser than the average value of virtual background image 130 will be canceled out, leaving a live action image 140 with a correct foreground and an even background color. This provides a very evenly lit background, while retaining the live action subject 20, and provides an ideal image for the execution of the keying and compositing process.

The corrected image 140 may then be placed into an image compositing process 150 that will combine the foreground from corrected image 140 with a background from a variety of sources to produce an image 160. The image compositing process 150 may be one of a variety of methods or components, including real time processing systems or post processing based systems. Since most variations of the image compositing process 150 depend on the evenness of the background of their source images, the increased evenness of the background of corrected image 140 will be useful in a variety of situations. In the preferred embodiment, image compositing process 150 is another system of real time shader programs operating in the same video processing system 50.

Various embodiments of an automated background lighting compensation system are further contemplated. In an embodiment, a compensation system includes a virtual model of the background blue or green screen. This model is composed of three dimensional polygons that match the dimensions of the live action background screen, and have textures applied to them that match the current color and lighting on the physical background.

Since the visible background color may change depending upon the location of the camera taking the image, due to the angle that light reflects from the surface, an embodiment is to use the main video camera to capture images of the background for application to the virtual model.

In order to properly match the photographed textures to the background model, a variety of methods may be used. In an embodiment, a 3D camera tracking system mounted to the scene camera that measures the camera's position, orientation, and field of view is used. Given this information, and the distance of the camera lens to the wall that is being photographed, the resulting texture may be accurately matched to the polygon. An embodiment for the camera to wall measuring system is a laser range finder.

In order to generate the background texture that matches the incoming video texture, a frame of the virtual background must be rendered from the same position, orientation, and field of view as the current live action frame. An embodiment of this is a real time 3D virtual engine.

In order to orient the virtual 3D scene camera's viewpoint, the current live action camera's position, orientation, and field of view should be known. One embodiment of this is a 3D camera tracking system attached to the scene camera which provides this information to the virtual camera.

The incoming live action video must be processed to remove the background lighting variations. An embodiment of this is a graphical shader that operates within the same virtual engine that drives the generation of the virtual background.

In another embodiment of the present disclosure, the method for creating the textured 3D background may use photogrammetry techniques to generate the background model. This method searches for similar pixels in a variety of photographs to create a 3D textured model, or allows the user to define perspective points within a series of photographs to derive the model's geometry and texture.

In another embodiment of the present disclosure, the method for creating the textured 3D background may be a color laser scan of the background, which creates a high resolution colored mesh that may be used as the background model. In yet another embodiment of the present disclosure, a separate camera may be used to take pictures of the physical background.

Further, alternative embodiments may include the addition of textured models of arbitrary complexity to the virtual background model 70. These may be created to represent various physical objects such as stairs, tables, platforms, or other props that require human interaction, but are meant to be replaced visually by virtually rendered objects. The process described above may be generalized to handle these models.

Additional alternative embodiments include a variety of variations on the math used to combine live action image 120 and virtual background image 130. Since severe background lighting variations 15 will tend to show up in the foreground of the corrected image, a variety of automated 2D 'garbage matting' techniques may be used to preserve the image of subject 120. Most of these techniques involve doing a very coarse version of the color keying process that retains the subject but removes much of the background; this image is then overlaid atop the corrected image 140 to remove the visibility of lighting variation 15 on subject 20.

It will be understood that various modifications may be made to the embodiments disclosed herein. Therefore, the above description should not be construed as limiting, but merely as exemplifications of the various embodiments of the present disclosure. Those skilled in the art will envision other modifications within the scope and spirit of the claims appended hereto.

What is claimed is:

1. A system for removing background lighting variations from a live action image comprising:

at least one moving camera mounted on a camera tracking system for capturing at least one first live action image, the at least one first live action image comprising a first background, a subject, and at least one background lighting variation;

a video processor for creating a virtual background model of the first background, the virtual background model being substantially similar to the first background;

wherein the video processor combines the at least one first live action image and the virtual background model to generate a corrected image comprising the at least one first live action image with the at least one background lighting variation removed therefrom.

2. The system of claim 1, wherein the video processor includes at least one algorithm for determining the at least one variation in lighting of the first background.

3. The system of claim 1, wherein the camera tracking system is configured for tracking the position, orientation and field of view of the at least one moving camera.

4. The system of claim 3, wherein the video processor creates an image of the virtual background model from the same position, orientation and field of view as the position, orientation and field of view of the at least one moving camera.

5. The system of claim 1, wherein the video processor comprises a computer with at least one live video input, at least one camera tracking data input, and at least one video card to process multi-dimensional video and graphic calculations.

6. The system of claim 1, wherein the virtual background model is textured.

7. The system of claim 1, wherein the virtual background model is a colored screen.

8. A method for removing background lighting variations from a live action image comprising the steps of:

capturing at least one first live action image with a moving camera mounted on a camera tracking system, the at least one first live action image comprising a first background, a subject, and at least one background lighting variation;

creating a virtual background model of the first background, the virtual background model being substantially similar to the first background; and generating a corrected image comprising the at least one first live action image with the at least one background lighting variation removed therefrom.

9. The method of claim 8, wherein the camera tracking system is configured for tracking the position, orientation and field of view of the at least one moving camera.

10. The method of claim 9, wherein the camera tracking system is a 3D camera tracking system.

11. The method of claim 8, wherein a video processor performs the step of creating the virtual background model.

12. The method of claim 9 wherein the virtual background model is created from the same position, orientation and field of view as the position, orientation and field of view of the moving camera.

13. The method of claim 11, wherein the video processor performs the step of generating the corrected image.

14. The method of claim 11, wherein the video processor further includes at least one algorithm to perform the steps of the method.

15. The method of claim 8, wherein the method is performed in real time.

16. A method for removing background lighting variations from a live action image comprising the steps of:

capturing at least one first live action image with a moving camera mounted on a camera tracking system, the at least one first live action image comprising a first background, a subject and at least one background lighting variation;

creating a textured virtual background model of the first live action background, the textured virtual background model being substantially similar to the first live action background; and generating a corrected image in real time using at least one algorithm, the corrected image comprising the at least one first live action image with the at least one background lighting variation removed therefrom.

17. The method of claim 16, wherein the camera tracking system is configured for tracking the position, orientation and field of view of the moving camera.

18. The method of claim 17, wherein a video processor performs the step of creating the textured virtual background model.

19. The method of claim 18, wherein the video processor performs a step of creating an image of the virtual background model from the same position, orientation and field of view as used in the step of capturing.

20. The method of claim 18, wherein the video processor performs the step of generating the corrected image.

* * * * *